US009873602B2

(12) United States Patent
Beck

(10) Patent No.: US 9,873,602 B2
(45) Date of Patent: *Jan. 23, 2018

(54) BOOM PROTECTION SYSTEM

(71) Applicant: Altec Industries, Inc., Birmingham, AL (US)

(72) Inventor: Aaron Beck, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,882

(22) Filed: May 23, 2016

(65) Prior Publication Data

US 2017/0334698 A1 Nov. 23, 2017

Related U.S. Application Data

(63) Continuation of application No. 15/161,798, filed on May 23, 2016, now Pat. No. 9,573,797.

(51) Int. Cl.
*G08B 21/00* (2006.01)
*B66F 17/00* (2006.01)
*G08B 21/18* (2006.01)
*G08B 21/02* (2006.01)
*B66F 11/04* (2006.01)

(52) U.S. Cl.
CPC .......... *B66F 17/006* (2013.01); *G08B 21/02* (2013.01); *G08B 21/182* (2013.01); *B66F 11/044* (2013.01)

(58) Field of Classification Search
CPC ........ B66F 11/044; B66F 17/006; G01L 1/22; G01L 1/2243; G01L 5/0061; G01L 25/00; G01L 1/04; G01L 27/002; G01L 5/06; G01L 5/108; E02F 3/304; E02F 3/36; E02F 3/435; E02F 3/46; E02F 9/2025; E02F 9/2029; E02F 9/26
USPC ...... 340/666, 685–689, 636.17, 636.16, 665, 340/679–680, 672, 686.5

See application file for complete search history.

(56) References Cited

U.S. PATENT DOCUMENTS

| 4,231,313 | A | * | 11/1980 | Heerema | ................. | B63B 39/03 114/125 |
| 6,439,341 | B1 | * | 8/2002 | Engvall | ................. | B66F 11/046 182/18 |
| 9,573,797 | B1 | * | 2/2017 | Beck | .................... | B66F 17/006 |

(Continued)

*Primary Examiner* — Daniel Previl
(74) *Attorney, Agent, or Firm* — Erise IP, P.A.

(57) ABSTRACT

A boom protection system prevents damage to an insulated boom section. The boom protection system has a static strain-detection assembly, a pressure-detection assembly, and an alarm. The static strain-detection assembly is configured to determine a load disposed from an implement at a distal end of said insulated boom section. The static strain-detection assembly includes a subject plate presenting a void therein, a traversing member spanning the void, and a strain gauge disposed adjacent to the traversing member. The pressure-detection assembly is configured to detect pressure within a hydraulic cylinder that is associated with the insulated boom section. The pressure detection assembly comprises a first pressure gauge at a distal end of the hydraulic cylinder, and a second pressure gauge at a proximal end of the hydraulic cylinder. The alarm is configured to alert a user of potential structural damage to the insulated boom section.

21 Claims, 9 Drawing Sheets

(56) References Cited

U.S. PATENT DOCUMENTS

| | | | | |
|---|---|---|---|---|
| 2012/0082422 A1* | 4/2012 | Sarchi | ............... | G01K 11/32 385/101 |
| 2015/0044003 A1* | 2/2015 | Pham | ............... | B65D 88/32 414/332 |
| 2015/0273253 A1* | 10/2015 | Lenz, Jr. | ............... | A62C 27/00 280/4 |
| 2015/0300906 A1* | 10/2015 | Claxton | ............... | G01L 25/00 702/98 |

* cited by examiner

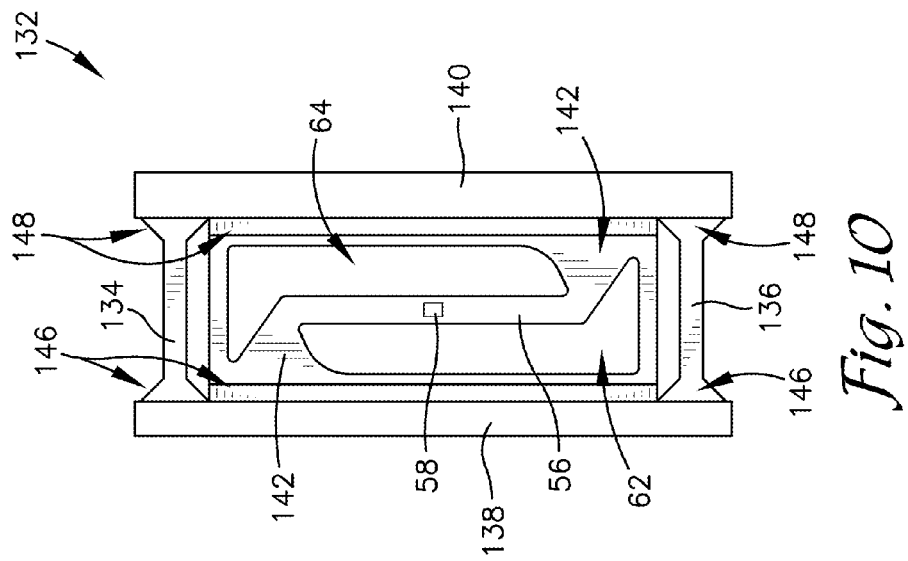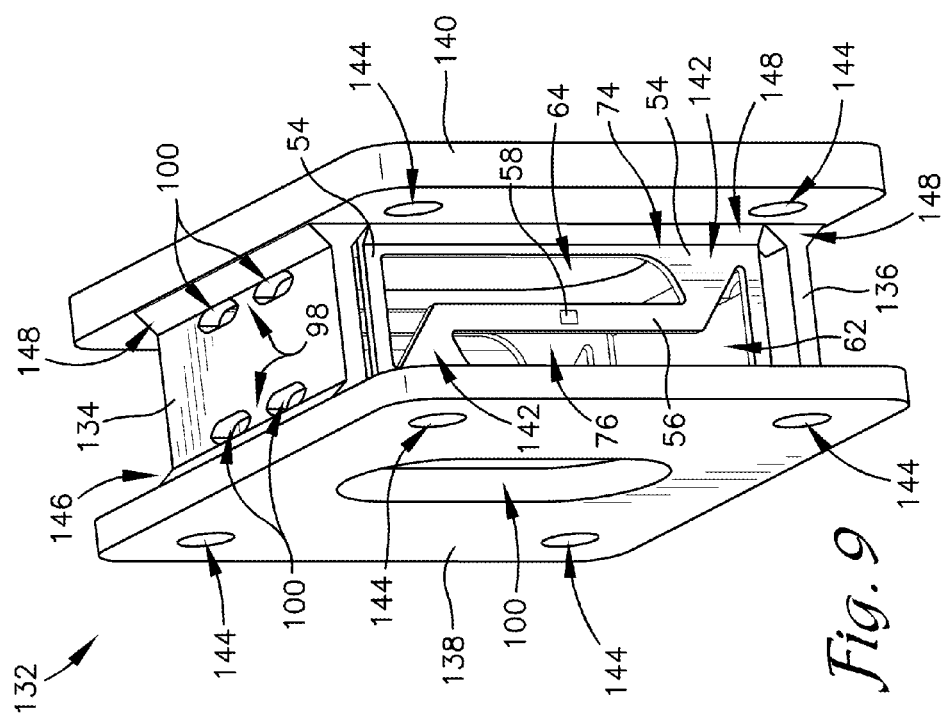

BOOM PROTECTION SYSTEM

RELATED APPLICATIONS

This patent application claims priority benefit, with regard to all common subject matter, of commonly assigned and concurrently filed U.S. patent application Ser. No. 15/161,798, filed May 23, 2016, and entitled "BOOM PROTECTION SYSTEM." The above-referenced patent and application are hereby incorporated by reference in their entirety into the present application.

BACKGROUND

1. Field

Embodiments of the invention relate to aerial devices and utility platforms. More specifically, embodiments of the invention relate to the protection of insulated boom sections.

2. Related Art

Utility workers utilize an aerial device to reach inaccessible locations. The aerial device generally includes a boom assembly with a utility platform connected to a distal end of the boom. One or more utility workers stand in the utility platform. Utility workers typically use an aerial device to access overhead electric power lines and electric power components for installation, repair, or maintenance. The utility workers may also lift repair parts and other objects utilizing a jib associated with the utility platform. The utility platform and at least one boom section are highly insulated so as to prevent the discharge of electricity through the utility truck, and especially through the utility worker. Because at least one boom section is formed of fiberglass, or another polymer, structural strength of the boom is a consideration.

Four-bar linkages have been utilized in the prior art to determine the amount of load on the boom. However, four-bar linkages provide several drawbacks. First, four-bar linkages have friction that introduces an error into the strain calculations. Second, four-bar linkages often cause a hysteresis. Hysteresis is the tendency to make measurements not repeatable, because future results are affected at least in part by past results. For example, if you start with a first reading on the gauge, add a certain weight to obtain a second reading on the gauge, and then remove the weight to obtain a third reading on the gauge, then hysteresis is the first reading being different from the third reading, even though the weight on the boom is the same in both situations. Third, four-bar linkages of the prior art have a difficult time isolating the measurement of adverse loadings (i.e., other than in a straight-downward direction). Four-bar linkages measure a total or average loading thereon, this can be disadvantageous because the vertical loading is the most likely to cause a structural failure. Some four-bar linkages may isolate vertical loadings, but these are prone to hysteresis and error when manufactured within easily achievable tolerance and materials.

SUMMARY

Embodiments of the invention solve the above-mentioned problems by providing a boom protection system for preventing damage to an insulated boom. The boom protection system may include a strain-detection assembly and a pressure-detection assembly. The strain-detection assembly is static, such that it experiences less hysteresis than with four-bar linkages of the prior art. The pressure-detection assembly measures the effective pressure within a hydraulic cylinder associated with the boom to determine the load thereon. The strain-detection assembly and the pressure-detection assembly may be utilized individually or in concert to determine an amount of strain acting on the insulated boom section. The strain-detection assembly includes non-measured components that support undesired forces (such as twisting forces, horizontal forces, and moments) and measured components that support the desired forces (such as a vertical force) that cause strain on the insulated boom section. The strain-detection assembly therefore isolates only the relevant loads to protecting the insulated boom section and supports the other loads without substantial measurement. This information can then be utilized to determine when and if structural damage is likely. A boom protection system may then take preventative measures, present an alarm to the user, and/or contact a remote computing system to take corrective action.

A first embodiment of the invention is directed to a boom protection system for preventing damage to an insulated boom section, comprising a static strain-detection assembly, a pressure-detection assembly, and an alarm. The static strain-detection assembly is configured to determine a load disposed from an implement at a distal end of said insulated boom section. The static strain-detection assembly includes a subject plate presenting a void therein, a traversing member spanning the void, and a strain gauge disposed adjacent to the traversing member. The pressure-detection assembly is configured to detect pressure within a hydraulic cylinder that is associated with the insulated boom section. The pressure detection assembly comprises a first pressure gauge at a distal end of the hydraulic cylinder, and a second pressure gauge at a proximal end of the hydraulic cylinder. The alarm is configured to alert a user of potential structural damage to the insulated boom section.

A second embodiment of the invention is directed to a static strain-detection assembly configured to be secured at a distal end of an insulated boom section so as to measure a load thereon. The static strain-detection assembly is configured to be installed between the distal end of the insulated boom section. The static strain-detection assembly comprises a subject plate, a traversing member, a strain gauge, and a support member. The subject plate presents a void therein. The traversing member spans the first void. The first strain gauge disposed adjacent to the first traversing member to measure a strain upon the traversing member. The support member also spans the first void to provide structural stability to the first subject plate.

A third embodiment of the invention is directed to a boom protection system for preventing damage to an insulated boom comprising a first static strain-detection assembly, a second static strain-detection assembly, and an alarm. The first static strain-detection assembly is associated with a utility platform disposed on a distal end of the insulated boom section. The first static strain-detection assembly includes a first subject plate presenting a first void therein, a first traversing member spanning the first void, and a first strain gauge disposed adjacent to the first traversing member. The second static strain-detection assembly associated with a working jib disposed at the distal end of the insulated boom section. The second static strain-detection assembly includes a second subject plate presenting a second void therein, a second traversing member spanning the second void, and a second strain gauge disposed adjacent to the second traversing member. The alarm is configured to alert a user of potential structural damage to the insulated boom section.

A fourth embodiment of the invention is directed to a static strain-detection assembly configured to be secured at a distal end of an insulated boom section so as to measure a load thereon. The static strain-detection assembly comprises a subject plate and a traversing member. The subject plate presents a void therein. The traversing member spans the first void. The first traversing member presents a gauge receptor thereon, wherein the gauge receptor is configured to receive a first strain gauge disposed adjacent thereon. The first strain gauge is configured to measure a strain upon the traversing member.

A fifth embodiment of the invention is directed to a method of protecting a boom section so as to prevent failure of the boom section, the method comprising the following steps: measuring load from a first strain-detection assembly disposed at a distal end of the boom section, wherein the first strain-detection assembly is associated with a first implement; measuring load from a pressure-detection assembly associated with an actuator configured to move the boom section; calculating a total strain on the boom section; determining whether the total strain is above a certain threshold; and alerting a user that the total strain is above said certain threshold.

A sixth embodiment of the invention is direct to a method of protecting a boom section so as to prevent failure of the boom section, the method comprising the following steps: measuring load from a first strain-detection assembly disposed at a distal end of the boom section, wherein the first strain-detection assembly is associated with a first implement; determining a strain on the boom section based upon at least one criteria selected from the group consisting of a position of the boom section, an elongation of the boom section, and an orientation of the boom section; calculating a total strain on the boom section based upon said measured strain from the first strain-detection assembly and said determined strain from the at least one criteria; determining whether the total strain is above a certain threshold; and alerting a user that the total strain is above said certain threshold.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 9 is a perspective view of an intermediary plate assembly; and

FIG. 10 is a side view of the intermediary plate assembly of FIG. 9.

Figure 1:
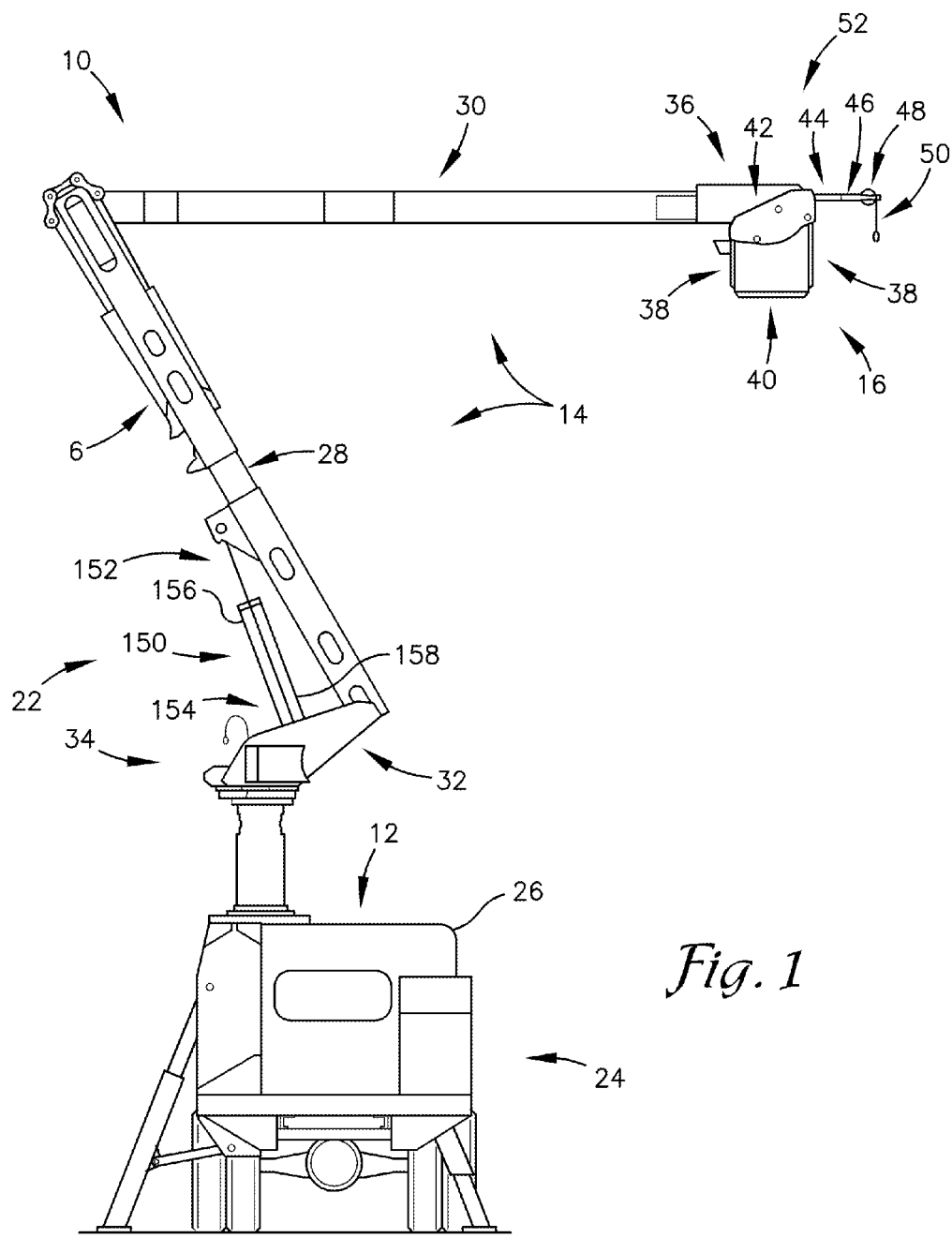
FIG. 1 is an environmental view of an aerial device with a boom assembly a utility platform assembly, and a working jib.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aerial device 10, constructed in accordance with various embodiments of the invention, is shown in FIG. 1. The aerial device 10 generally comprises a base 12 with a boom assembly 14 rotatably mounted thereto. A utility platform assembly 16 is disposed on the boom assembly 14 to provide an aerial platform for the accomplishment of a task by a utility worker. A boom protection system 18 identifies excessive loads on the insulated boom. In embodiments of the invention, the boom protection system 18 comprises a static strain-detection assembly 20 and a pressure-detection assembly 22. The boom protection system 18 may also include an alarm 24 for alerting the utility worker that a potential dangerous strain is being experienced.

The base 12 of the aerial device 10 is a selectively stabilized platform. In embodiments of the invention, the base 12 is a utility truck 26 (as illustrated in FIG. 1), a crane base, an oilrig, an earth-working machine, or a fixed structure. The base 12 provides stability and a counterweight to a load being supported by the boom assembly 14.

The boom assembly 14 broadly comprises a lower boom section 28 and at least one insulated upper boom section 30. It should be appreciated that the majority of the present disclosure is concerned with the detection of strain within the upper boom section 30, which will commonly be referred to as an insulated boom section 30 because other boom sections may also be insulated for safety reasons. Because insulating a boom, such as by forming it of a polymer, significantly reduces the structural strength, monitoring the strain thereon can prevent structural failure.

As illustrated in FIG. 1, some embodiments of the boom assembly 14 may further comprise at least one pivoting boom section 32. The boom assembly 14 presents a proximal end 34 and a distal end 36. The proximal end 34 is rotatably and/or pivotably secured to a portion of the base 12. The distal end 36 is secured to the utility platform assembly 16. In some embodiments, the at least one upper boom section 30 is at least in part disposed within the lower boom section 28. The at least one upper boom section 30 telescopes to extend or retract into the lower boom section 28. In other embodiments, the upper boom section 30 pivots relative to the lower boom section 28, such as illustrated in FIG. 1. The pivoting boom section 32 does not telescope out of any other boom section. Instead the pivoting boom section 32 rotates about the base 12, and the first boom section pivots and/or rotates relative to the pivoting boom section 32. The use of the pivoting boom section 32 allows the utility platform assembly 16 to reach certain areas and avoid obstacles in the working environment.

Figure 5:
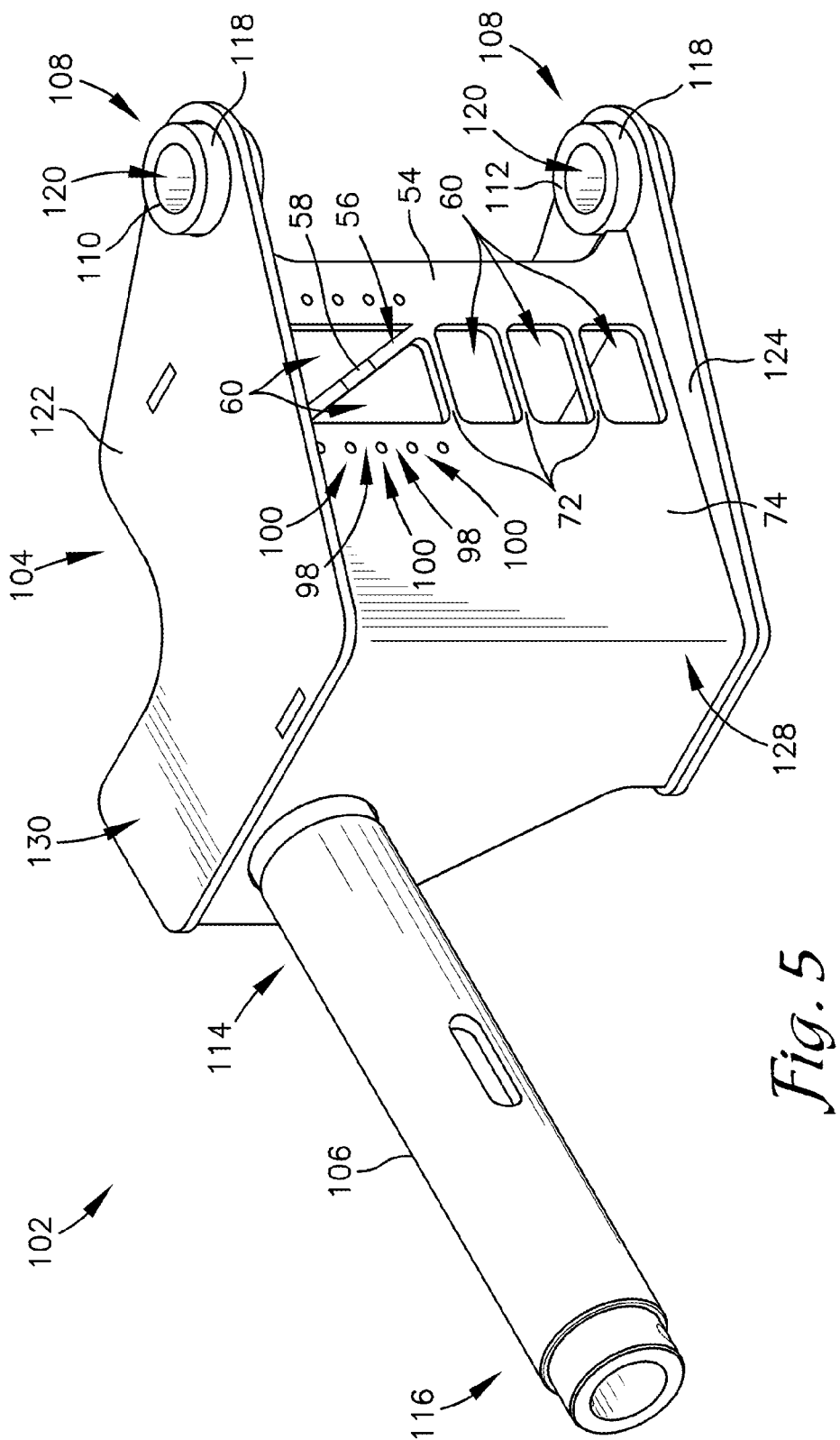
FIG. 5 is a perspective view of a pin interface assembly as shown from a first side.

The utility platform 18 provides an elevated surface from which at least one utility worker can perform a task. As illustrated in FIG. 5, embodiments of the utility platform 18 comprise four bucket sidewalls 38 and a bucket floor 40 that collectively form a cavity 42. The utility platform 18 may also present a bucket lip along a top portion of at least one bucket sidewall 38. The utility platform 18 may further comprise a step 50 and/or a door (not illustrated) in at least one of the bucket sidewalls 38 to allow for ingress and egress of the utility worker. The utility platform 18 may also comprise a handrail (not illustrated).

The four bucket sidewalls 38 and the bucket floor 40 of the utility platform 18 form the cavity 42. The four bucket sidewalls 38 may be unitary, i.e. formed of a single monolithic structure, or they may be coupled together. The transition between successive bucket sidewalls 38, and/or between the bucket sidewalls 38 and the bucket floor 40, may be rounded or arcuate.

In some embodiments, the utility platform 18 presents a horizontal cross-section that is substantially rectangular. Thus, two of the opposing bucket sidewalls 38 may have a greater width than the other two opposing bucket sidewalls 38. In other embodiments, the utility platform 18 presents a horizontal cross-section that is substantially square. Although the dimensions of the utility platform 18 may vary widely, an exemplary small one-worker platform has a horizontal cross-section of approximately 24 inches square (or 576 square inches). A large one-worker platform (also known as a "man-and-a-half" platform) is approximately 24 inches by approximately 30 inches (or 720 square inches). An exemplary platform for two utility workers 18 has a horizontal cross-section of approximately 24 inches by approximately 40 inches (or 1,152 square inches). Each of the exemplary platforms has a height of approximately 42 inches. Other embodiments of the utility platform 18 may be other shapes about the horizontal cross-section, such as an ellipse, a circle, a D-shape, a triangle, a trapezoid, a rhombus, or other quadrilateral.

In embodiments of the invention, a working jib 44 is disposed at the distal end 36 of the boom assembly 14. In some embodiments, the working jib 44 may be disposed on or adjacent to the utility platform. Typically, the working jib 44 is secured to the distal end 36 of the boom assembly 14 independently from the utility platform. This is because the working jib 44 and the utility platform typically move independently from one another, and also to allow the working jib 44 to support a larger load. The working jib 44 includes a jib arm 46, a winch 48, and a load line 50 disposed from the jib arm 46. The winch 48 lets out and takes up the load line 50, which is directed downward overt the jib arm 46.

The working jib 44 is typically utilized by the utility worker to raise and lower various repair parts, damaged parts, tools, and the like. Because the utility platform may not be able to support all the weight (and/or all the space) of the utility worker, the tools, the repair part, and the removed parts; the working jib 44 is utilized to selectively raise and lower parts and tools as needed.

It should be noted that an implement 52, as described herein, may refer to the working jib 44, the utility platform, or another tool disposed at the distal end 36 of the boom assembly 14. Other examples of implements 52 could include digger derricks, pole guides, luffing jibs, crane booms, winches, safety equipment, and the like.

Various embodiments of the boom protection system 18 will now be discussed. In embodiments of the invention, the boom protection system 18 comprises a first strain-detection assembly 20 associated with the utility platform for estimating a load placed on the boom by the utility platform, a second strain-detection assembly 20 associated with a working jib 44 for estimating a load placed on the boom by the working jib 44, and a pressure-detection assembly 22 for determining a load placed on the boom by the various boom components and their orientations.

The static strain-detection assembly 20 will now be discussed. The static strain-detection assembly 20 is configured to determine a load disposed from an implement 52 (such as a utility platform, a working jib 44, or other implement 52) at a distal end 36 of the insulated boom section 30, or to provide an indication of the load disposed from an implement 52. The static strain-detection assembly 20 is disposed at least partially between the distal end 36 of the insulated boom section 30 and the implement 52. The weight of the implement 52 (as well as the weight of any load suspended in or on the implement 52) is therefore determined at least in part by the static strain-detection assembly 20.

In embodiments of the invention, the static strain-detection assembly 20 is at least partially static, solid, and monolithic. This allows the static strain-detection assembly 20 to support the weight without significantly displacing, changing shape, or moving. As discussed above, four-bar linkages induce a friction that introduces an error and/or a hysteresis into the calculation of the load thereon. The friction causes a loss in the applied force, such that when the force is removed, the reading does not fully return to zero. Embodiments of the invention therefore eliminate this friction by performing the analysis on a rigid plate, instead of on a flexible or semi-rigid four-bar linkage. This eliminates or reduces the hysteresis, such that repeatable and accurate results can be achieved.

In embodiments of the invention, the static strain-detection assembly 20 comprises a subject plate 54, a traversing member 56, and a strain gauge 58. The subject plate 54 is generally rigid and solid, without any moving parts as are common in a four-bar linkage. The subject plate 54 presents a void 60 (or hole, recess, or opening) therein. At least one traversing member 56 spans the void 60 so as to create a first opening 62 and a second opening 64. As can be seen, in embodiments of the invention each of the first opening 62 and the second opening 64 is substantially triangular in shape because the traversing member 56 is disposed diagonally therein (as discussed below). The first opening 62 and the second opening 64 are bisected by the traversing member 56 spanning the void 60. The strain gauge 58 is then disposed on or adjacent to the traversing member 56. The strain gauge 58 provides an indication of the strain upon the traversing member 56, which is indicative of the strain on the subject plate 54 and the load on the insulated boom section 30 caused by the implement 52 (as well as the persons, equipment, and additional loads therein).

Figure 2:
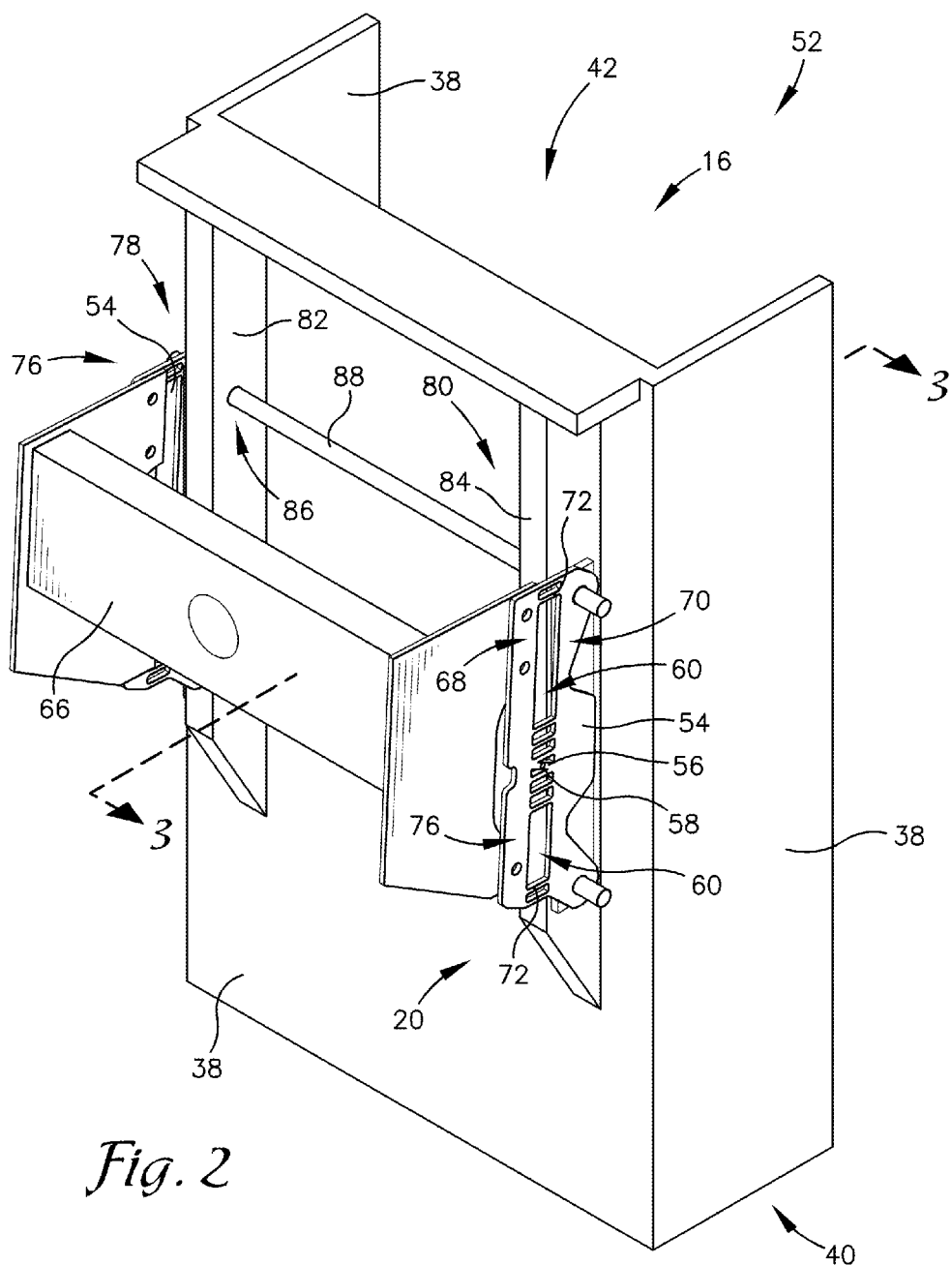
FIG. 2 is a perspective view of a utility platform assembly illustrating how a platform bracket utilizes the strain-detection assembly.
Figure 3:
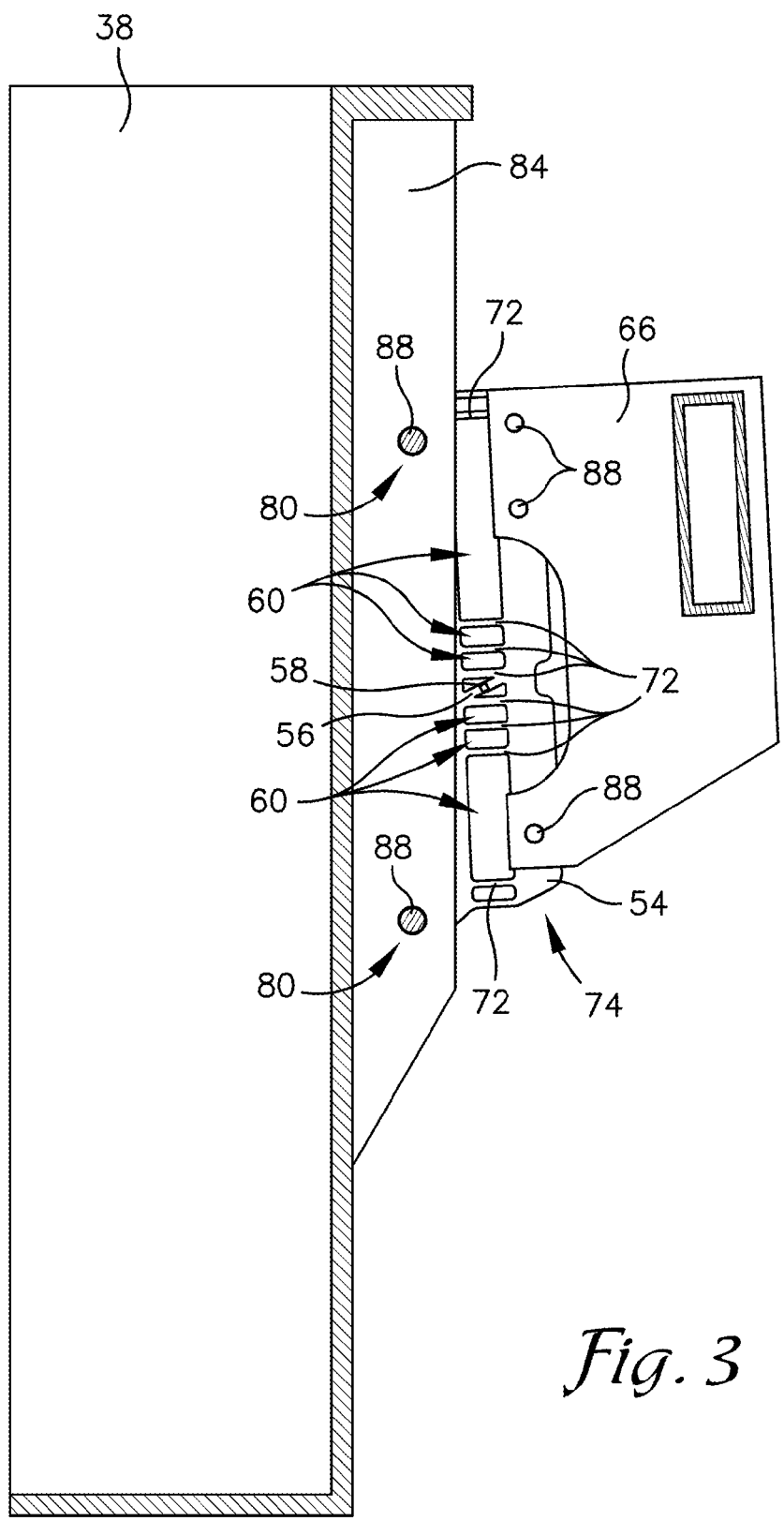
FIG. 3 is a vertical cross-sectional view of the platform bracket from FIG. 2, through the line 3-3 of FIG. 2.
Figure 6:
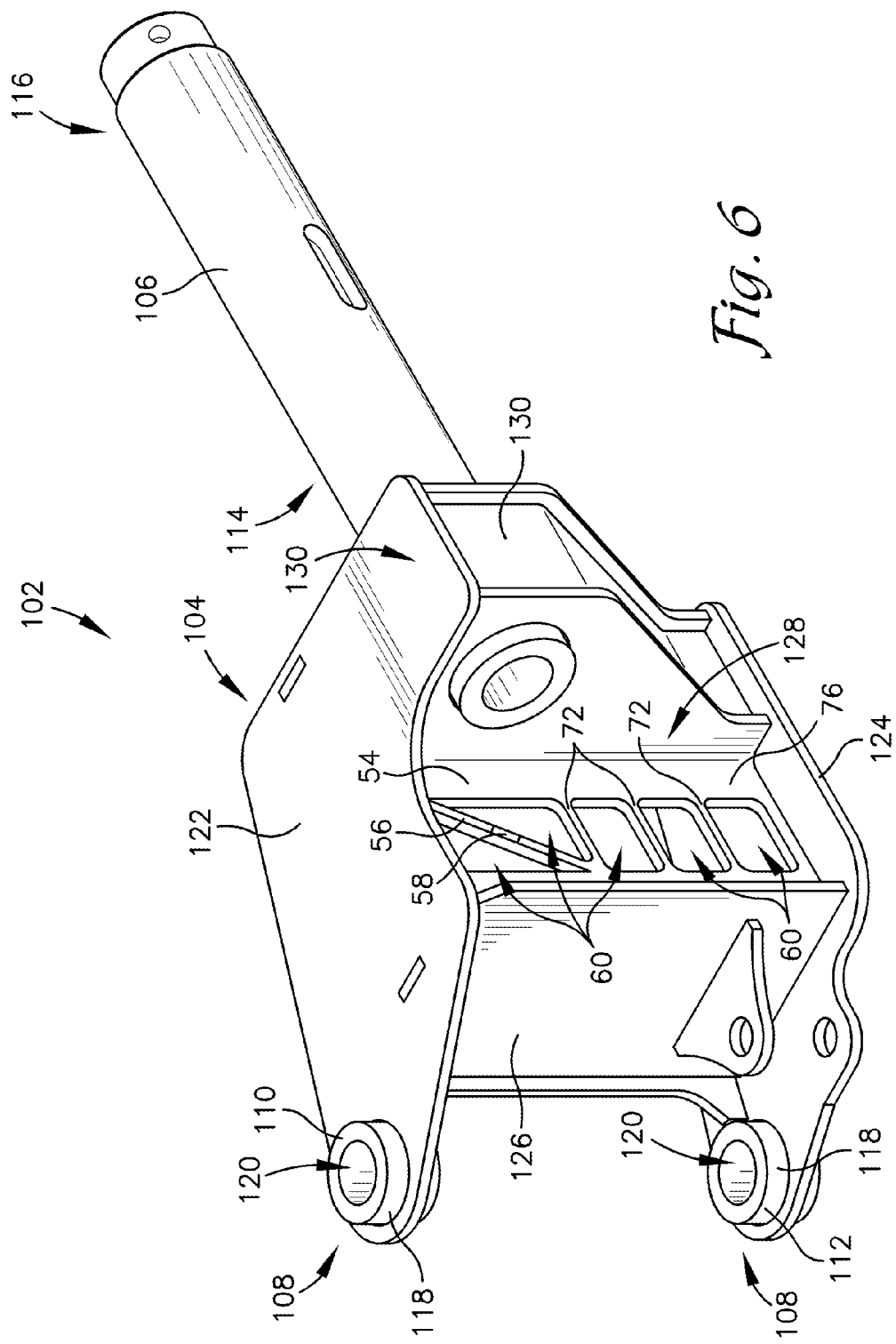
FIG. 6 is a perspective view of the pin interface assembly of FIG. 5, as viewed from a second side that is substantially opposite the first side.
Figure 8:
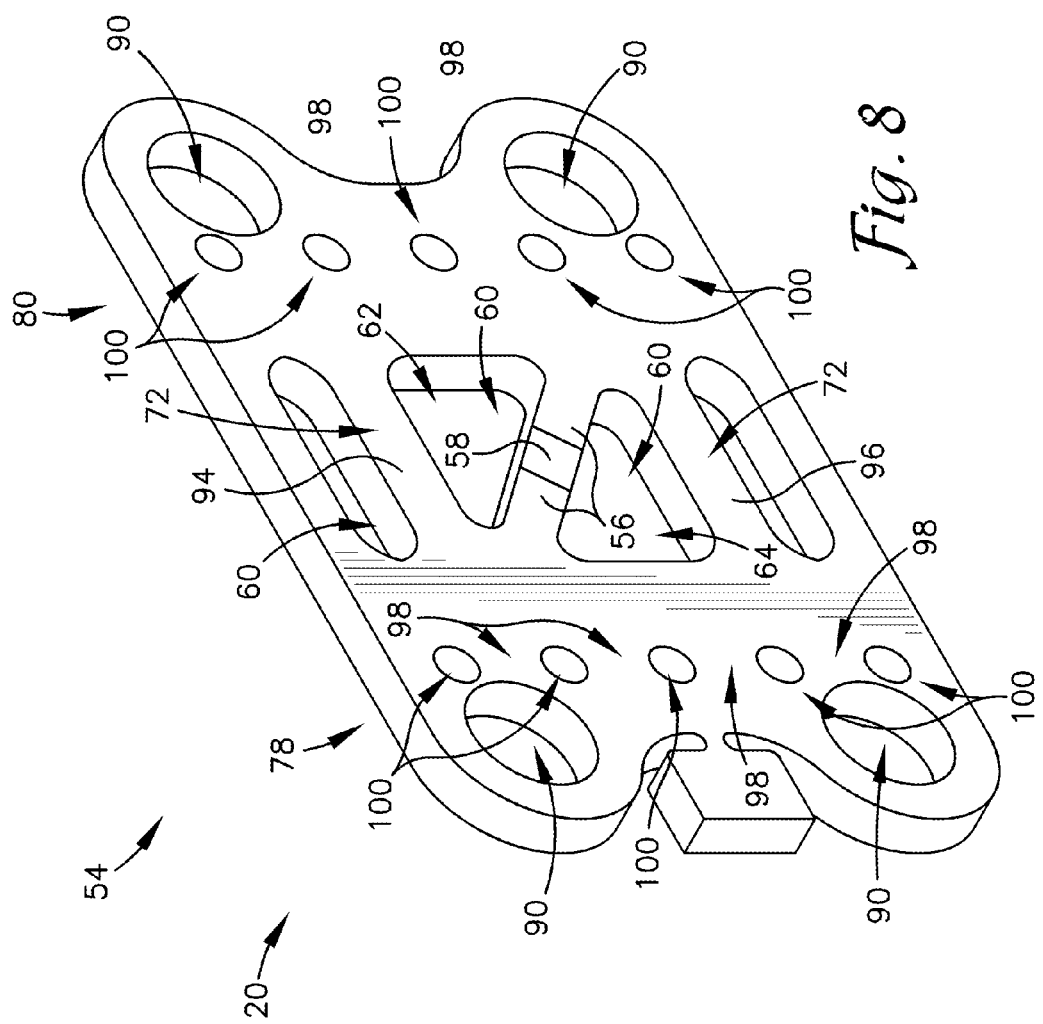
FIG. 8 is a perspective view of the subject plate of the pin interface assembly that is configured to be added to an existing structure.

In various embodiments of the invention, the subject plate 54 is disposed in various sizes, shapes, and orientations. In some embodiments of the invention, the subject plate 54 is disposed between two other components, such as between a platform bracket 66 and the utility platform as illustrated in FIGS. 2 and 3. In other embodiments, the subject plate 54 is a component of an intermediary interface, such as illustrated in FIGS. 5 and 6. In still other embodiments, the subject plate 54 is configured to be added to an existing structure or applied over an opening in the structure, such as illustrated in FIG. 8. Each of these exemplary uses is discussed more below.

In embodiments of the invention, the subject plate 54 presents the void 60 therein. The void 60 is an opening or other recess within the subject plate 54. The void 60 isolates the forces such that they act on the traversing member 56 or members. The traversing member 56 spans across the void 60 to connect a first side 68 of the subject plate 54 to a second side 70 of the subject plate 54. The first side 68 of the subject plate 54 is opposite the second side 70 of the subject plate 54.

Figure 4:
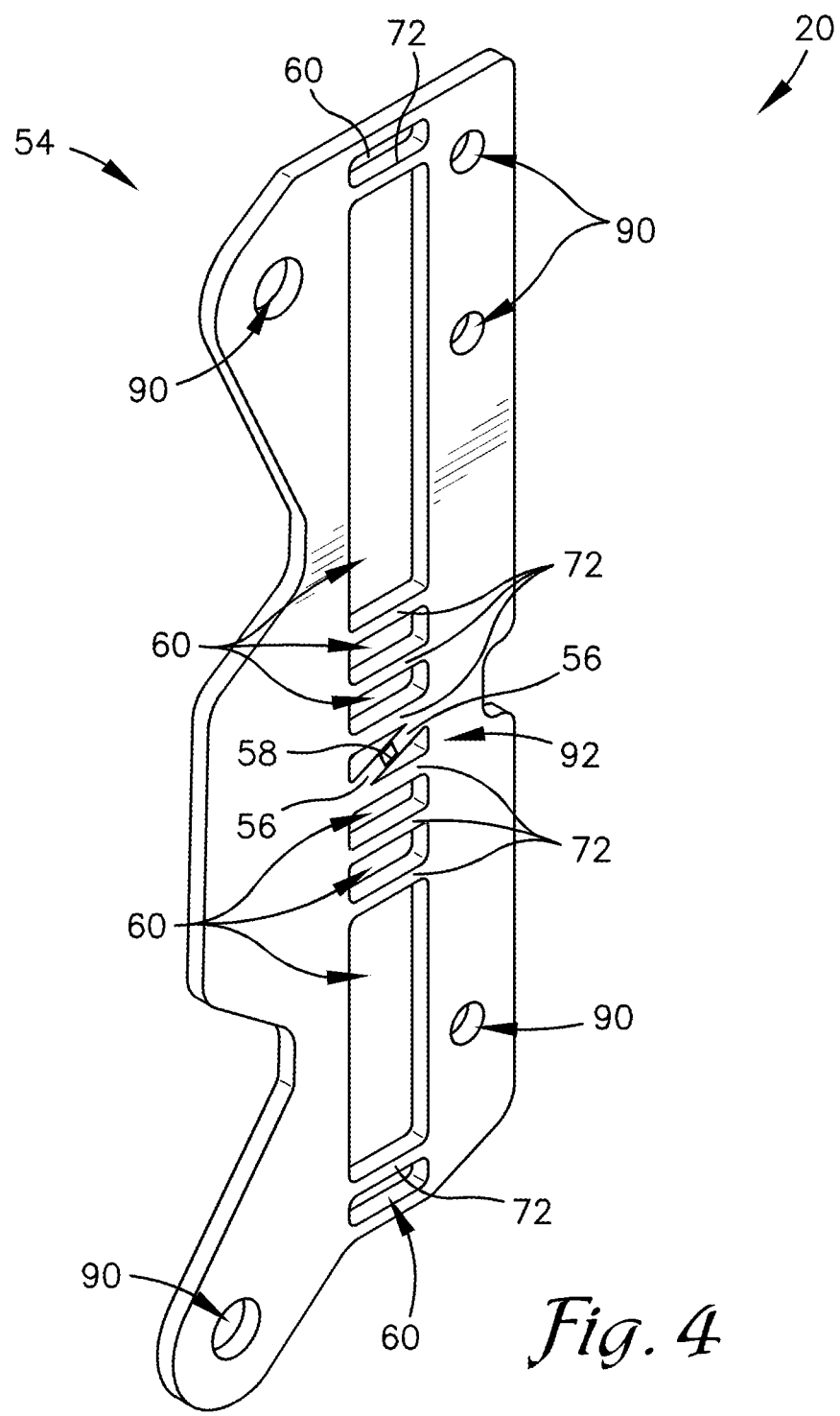
FIG. 4 is a perspective view of the subject plate of the strain-detection assembly from FIG. 2.

In embodiments of the invention, a support member 72 also spans the void 60. The support member 72 provides structural support for the subject plate 54 while allowing the subject plate 54 to traversing member 56 to flex and slightly deform so as to experience the strain thereon. The support member 72 supports the loads that are not relevant to the protection of the insulated boom section 30, such as moment and horizontal forces. By supporting these forces, the support member 72 allows the traversing member to substantially only measure the load of the vertical force. Unlike a four-bar linkage, the subject plate 54 does not actually substantially move in experiencing the strain. In some embodiments, multiple support members 72 are utilized to assist the traversing member 56 in safely experiencing the strain while still supporting the load placed thereon. As seen in FIG. 4, in some embodiments, there may be eight or more additional support members 72. More or fewer support members 72 may also be utilized. In other embodiments, other geometries may be utilized as discussed below.

In some embodiments of the invention, the subject plate 54 is oriented vertically and the traversing member 56 is oriented diagonally. In these embodiments, the support members 72 may be disposed horizontally. The diagonal orientation of the traversing member 56 allows the traversing member 56 to sense strain in more than one orientation. The diagonal orientation may also allow the traversing member 56 to experience the strain of the implement 52 more directly, so as to give a more precise reading. The diagonal orientation may also separate the moment acting on the traversing member 72 from the vertical force (so as to allow measurement of the vertical force). The horizontal orientation of the support members 72 prevents the stress as measured in the traversing member 56 from being affected by horizontal forces, that would have little or no effect on potentially damaging strain. The horizontally disposed support members 72 therefore isolate the forces acting on the subject plate 54 such that only the vertical forces are substantially measured.

In some embodiments of the invention, such as illustrated in FIGS. 2 and 3, the subject plate 54 is disposed between the platform bracket 66 and the utility platform. The subject plate 54 supports at least a portion of a weight of the utility platform. The subject plate 54 therefore is used to provide an indication of the amount of load suspended in, on, and from the utility platform. The load could include utility workers, repair parts, installation parts, tools, safety equipment, winches, upper boom controls, as well as the utility platform itself.

In these embodiments, the static strain-detection assembly 20 may include a first subject plate 74 and a second subject plate 76. The first subject plate 74 may be disposed on a first side 78 of the platform bracket 66 and the second subject plate 76 may be disposed on a second side 80 of the platform bracket 66. The first subject plate 74 may be secured to a first support protrusion 82 of the utility platform, and the second subject plate 76 may be secured to a second support protrusion 84 of the utility platform. The first support protrusion 82 and the second support protrusion 84 are a component of or are associated with the utility platform. The first support protrusion 82 and the second support protrusion 84 may also present at least one connection segment 86 for receiving a pin 88 therethrough. The pin 88 traverses the connection segment 86 and a pin opening 90 of the subject plate 54.

In these embodiments, the static strain-detection assembly 20 may utilize the first subject plate 74, the first strain gauge 58, the second subject plate 76, and the second strain gauge 58 to acquire or provide a better indication of the load thereon. For example, a failure of the insulated upper boom may be caused by a twisting or side load on the insulated upper boom. The insulated upper boom is typically designed to withstand a much larger load in a straight-downward direction (e.g., in a pivoting plane of the boom assembly 14). Loads applied outside the pivoting plane, such as by an uneven load, are more likely to cause structural damage. Therefore, by comparing the respective load indications from the first strain gauge 58 to the second strain gauge 58, an overall strain may be easily detected. This may include a portion of the overall strain that is applied outside the pivoting plane of the boom assembly 14.

In some embodiments, the subject plate 54 is disposed between a distal end 36 of the insulated boom section 30 and the working jib 44 (not illustrated). The subject plate 54 supports at least a portion of the working jib 44. In some embodiments of the invention, the working jib 44 is disposed at the distal end 36 of the insulated boom section 30 adjacent to, but not directly on or associated with the utility platform. This is because it is often advantageous to move and utilize the working jib 44 independently of the utility platform. Also, the application of a load to the working jib 44 is likely to increase the total strain on the insulated boom section 30.

In some embodiments, the static strain-detection assembly 20 comprises a first subject plate 74 disposed between the distal end 36 of the insulated boom section 30 and the utility platform and a second subject plate 76 disposed between the distal end 36 of the insulated boom section 30 and the working jib 44. In still other embodiments, a first static strain-detection assembly 20 is configured to be installed between the distal end 36 of the insulated boom section 30 and the utility platform, and a second static strain-detection assembly 20 is configured to be installed between the distal end 36 of the insulated boom section 30 and the working jib 44.

The traversing member 56 spans the void 60 and is configured to experience the strain that is emplaced on the subject plate 54. As discussed above, in embodiments of the invention, the subject plate 54 is secured to at least one external object via a pin 88, bolt, or other fastener. As the pins 88 are moved relative to one another and relative to the plate (due to the load thereon), a strain is placed on the traversing member 56.

In embodiments of the invention, the traversing member 56 is elongated to span from the first side 68 of the subject plate 54 to the second side 70 of the subject plate 54. The traversing member 56 presents a shape that is generally flat and uniform along a length of the traversing member 56. The traversing member 56 may present a gauge receptor segment 92 that is configured to receive the strain gauge 58 thereon. The strain gauge 58 receptor may be generally between the first side 68 and the second side 70 of the subject plate 54. This allows the strain gauge 58 to be placed in a gauge receptor so as to ensure that the strain gauge 58 is centered on the traversing member 56 between the first side 68 and the second side 70.

In embodiments of the invention, the traversing member 56 is disposed diagonally within the void 60. As can be seen in FIGS. 4, 5, 6, and 8, in embodiments of the invention, the void 60 is generally rectangular and elongated in a vertical orientation. The traversing member 56 is therefore disposed therein diagonally to the generally vertical orientation of the void 60. As discussed above, the first opening 62 and the second opening 64 may therefore present a triangular shape.

It should be noted that the vertical orientation of the void 60, the diagonal orientation of the traversing member 56 and other directional and orientation descriptions are only applicable to certain embodiments of the invention. For example, the subject plate 54 as illustrated in FIG. 8 is configured to be added to an existing or created opening in a certain structure or member, such as along the various boom sections. This subject plate 54 may be installed on the device or structure in various orientations based upon the strain to be measured, the structural space to fit the subject plate 54, and other considerations. Therefore, in embodiments of the invention, the discussed directional and orientation descriptions are relative to the subject plate 54 itself, not necessarily to the overall implement positioned on the structure.

The strain gauge 58 is disposed onto or adjacent to the traversing member 56. The strain gauge 58 is configured to measure strain upon the traversing member 56. Strain gauges of various embodiments may include a metal foil gauge. As the traversing member 56 deforms slightly under the strain, the electrical resistance passing through the foil alters. The electrical resistance is altered because electrical conductance is dependent upon the geometry of the conductor. Stretching or compressing the conductor, such as within the strain gauge 58, increases and decreases the electrical resistance between respective ends. Typically, tension causes a higher resistance and compression causes a lower resistance. The altered electrical resistance is measured either directly at the static strain-detection assembly 20, or remotely, such as at a central computing unit as discussed below. In other embodiments, the strain gauge 58 may be a load cell, a semiconductor strain gauge 58 (also known as a piezoresistor), a nanoparticle strain gauge 58, or other type of strain gauge 58.

In embodiments of the invention, the support member 72 is spanning the void 60. The support member 72 typically does not include a strain gauge 58 thereon, but instead supports the other forces such that the traversing member 56 can measure the vertical (or other desired) forces. The support members 72 allow the traversing member 56 to experience the strain of the load, such that the strain can be accurately measured, while retaining the structural stability to keep the load secure and prevent unintended measurement changes due to forces in directions other than vertical. In some embodiments, there may be multiple support members 72 disposed around the traversing member 56. For example, as shown in FIG. 4, the plate may include an upper support member 94 and a lower support member 96, each being disposed adjacent to the traversing member 54. The plate may also include secondary support members 98 disposed between a secondary void 100. As can be seen, the secondary voids 100 are generally circular shaped with the secondary support members 98 being disposed therebetween. As another example, as illustrated in FIGS. 5-8, the secondary voids 100 are disposed along the first side 68 and the second side 70 of the subject plate 54. In some embodiments, the secondary voids 100 are configured to receive a fastener therethrough. The fastener may secure the subject plate 54 to another structure.

In some embodiments of the invention, the support member 72 is oriented horizontally. In other embodiments of the invention, the support member 72 is oriented vertically, diagonally, or in another direction. In some embodiments, the support member 72 is generally elongated and monolithic with the subject plate 54. In other embodiments, the support member 72 may be arcuate and/or polylithic with the subject plate 54.

In some embodiments of the invention, such as illustrated in FIGS. 5 and 6, the subject plate 54 of the static strain-detection assembly 20 is a component of or otherwise associated with a pin interface assembly 102. The pin interface assembly 102 is a weldment or other structure configured to secure the implement 52 to the distal end 36 of the insulated boom section 30. The pin interface assembly 102 is configured to allow the implement 52 to pivot and/or rotate relative to the distal end 36 of the insulated boom section 30. This may allow the implement 52 to level itself (such as wherein the implement 52 is the utility platform) or move to a desired orientation (such as wherein the implement 52 is the working jib 44), or perform other functions.

In embodiments of the invention, the pin interface assembly 102 comprises a housing 104, a boom-interface pin 106, and a pin receptor 108. Other embodiments of the invention, may include one boom-interface pin 106 and one receptor, two boom-interface pins 106, two pin receptors 108, or the like. In still other embodiments, the pin interface assembly 102 presents a solid connection (not illustrated) to hold the pin interface assembly 102 securely against the distal end 36 of the insulated boom section 30, against the implement 52, or both. The pin 88 and/or pin receptor 108 is associated with the implement 52 and the distal end 36 of the insulated boom section 30, as discussed below.

In the exemplary pin interface assembly 102 illustrated in FIGS. 5 and 6, the pin interface assembly 102 comprises the housing 104, the boom-interface pin 106, an upper implement-pin receptor 110, and a lower implement-pin receptor 112. The pin interface assembly 102 is configured to secure the implement 52 to the distal end 36 of the insulated boom section 30. As such, the pin interface assembly 102 facilitates the relative motion and rotation of the implement 52 and the distal end 36 of the insulated boom section 30.

The cylindrical boom-interface pin 106 is elongated so as to present a proximal end 114 and a distal end 116. The proximal end 114 is secured to the housing 104 (as discussed below). The distal end 116 of the boom-interface pin 106 is configured to fit within the distal end 36 of the insulated boom section 30. The distal end 116 of the boom-interface pin 106 is also configured to be secured within the distal end 36 of the insulated boom section 30. In some embodiments, the boom-interface pin 106 may also be configured to be rotated within the distal end 36 of the insulated boom section 30 so as to rotate or pivot the pin interface assembly 102 (and by extension, the implement 52 secured thereto).

The upper implement-pin receptor 110 and the lower implement-pin receptor 112 are disposed on the housing 104 to receive an implement pin (not illustrated) therefore. The upper implement-pin receptor 110 and the lower implement-pin receptor 112 are configured to receive a pin 88 that is oriented vertically therein. This is contrasted with the boom-interface pin 106 that is disposed horizontally. The contrasting orientations of the boom-interface pin 106 and the implement pin allow the implement 52 to be disposed at many relative orientations and to be capable of achieving many degrees of freedom. The upper implement-pin receptor 110 and the lower implement-pin receptor 112 each includes an annular segment 118 that presents an opening 120, as well as a protrusion from the housing 104. The opening is configured to receive the implement pin 88 therethrough. In embodiments of the invention, the upper implement-pin receptor 110 carries a majority of the load of the implement pin 88 and the lower implement-pin receptor 112 resists rotational forces for the implement pin 88. It should be noted that the load and rotational forces discussed include the forces of the load and the implement 52 itself on the implement pin 88.

Figure 7:
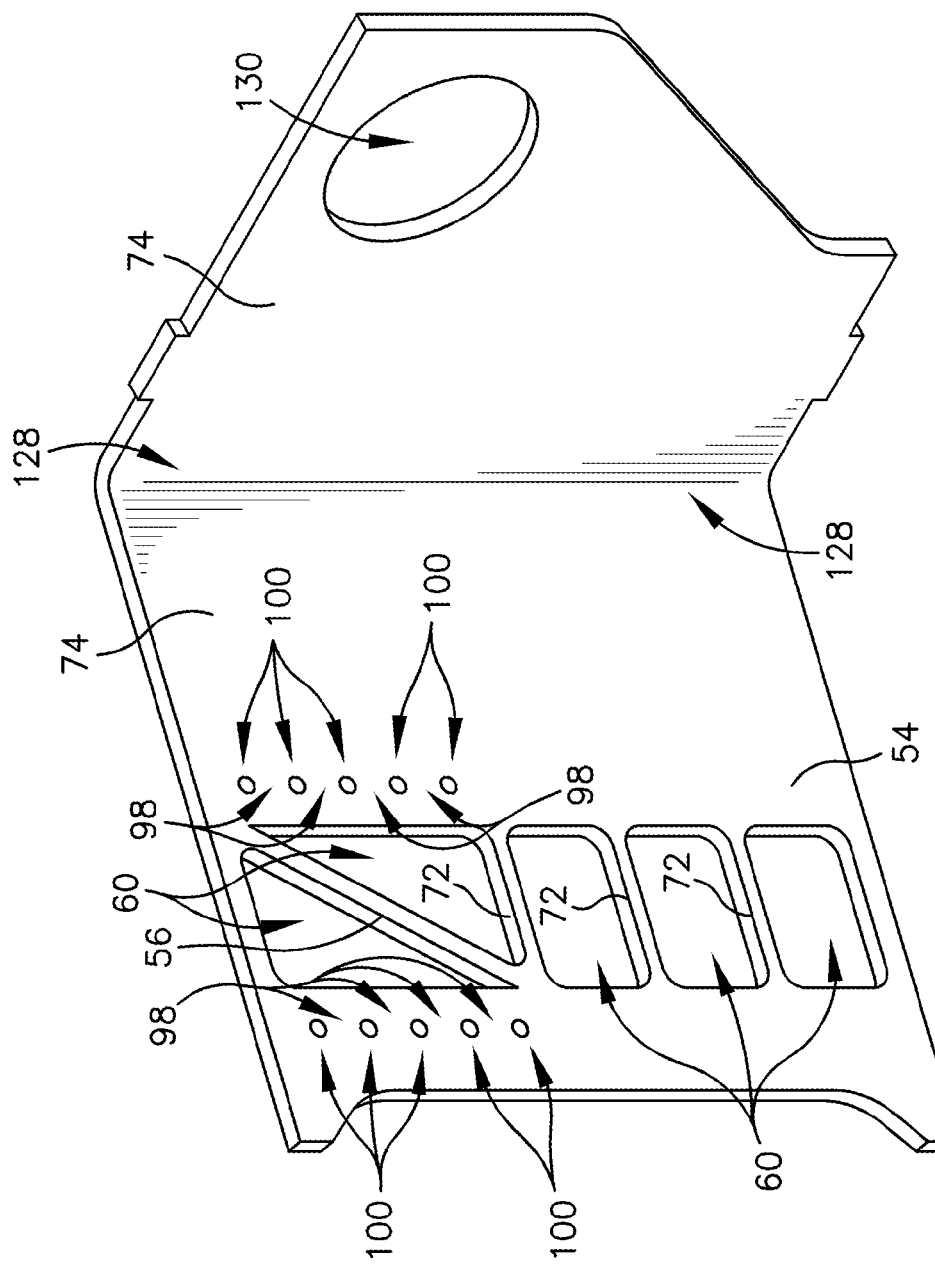
FIG. 7 is a perspective view of the subject plate of the pin interface assembly from FIGS. 5 and 6.

The housing 104 of the pin interface assembly 102 comprises a top plate 122, a bottom plate 124, a side plate 126, the first subject plate 74, and the second subject plate 76. The top plate 122 and the bottom plate 124 are disposed parallel to each other. The side plate 126, the first subject plate 74, and the second subject plate 76 are disposed between the top plate 122 and the bottom plate 124. As illustrated in FIG. 7, the first subject plate 74 presents a corner 128 and a pin securing segment 130, in addition to the void 60 and the traversing member 56 as discussed above.

In embodiments of the invention, the first subject plate 74 and the second subject plate 76 work in concert to determine the correct strain. The pin receptor 108 of the first subject plate 74 imparts a strain primarily on the first subject plate 74. The upper implement-pin receptor 110 and the lower implement-pin receptor 112 impart a strain primarily on the second subject plate 76. Therefore, by monitoring the strain on both the first subject plate 74 and the second subject plate 76, the static strain-detection assembly is more accurate at determining the strain emplaced on the insulated upper boom by the load from the implement 52.

In some embodiments of the invention, such as illustrated in FIGS. 9 and 10, the subject plate 54 of the static strain-detection assembly 20 is a component of or otherwise associated with an intermediary plate assembly 132. The intermediary plate assembly is a weldment or other structure configured to secure between two components of the aerial device 10. For example, the intermediary plate assembly may be configured to be secured between flanges of an existing bolted joint. The intermediary plate assembly may therefore be able to measure the load upon that joint so as to determine the strain on the insulated boom section 30.

In embodiments of the invention, the intermediary plate assembly 132 comprises the subject plate 54, an upper support plate 134, a lower support plate 136, a first structural interface plate 138, and a second structural interface plate 140. In embodiments of the invention, the intermediary plate assembly 132 presents a general rectangular prism shape (such as a general cube shape). The upper support plate 134 is disposed generally parallel to and opposite the lower support plate 136. The first structural interface plate 138 is generally parallel to and opposite the second structural interface plate 140. The subject plate 54 may include the first subject plate 74 that is generally parallel to and opposite the second subject plate 76.

In embodiments of the invention, the traversing member 56 of the subject plate 54 of the intermediary plate assembly 132 is disposed vertically. This may allow the traversing member 56 to be further separated from a moment emplaced thereon. In these embodiments, the traversing member 56 may include flared ends 142 that secure to the first side 68 and the second side 70, respectively. The flared ends 142 present the first opening 62 and the second opening 64 each in an elongated irregular shape, best illustrated in FIG. 10 (as opposed to the triangular shape as best illustrated in FIG. 8).

The first structural interface plate 138 and the second structural interface plate 140 may each present fastener receptors 144 and secondary voids 100. The upper support plate 134 and the lower support plate 136 may present secondary voids 100 as well as secondary supports 98 therethrough. The subject plate 54, the upper support plate 134, and the lower support plate 136 may also each present a first flared end 146 and a second flared end 148 each configured to secure to the first structural interface plate 138 and the second interface plate 140, respectively.

It should therefore be appreciated that FIGS. 2-10 illustrate various embodiments of strain detection assemblies 20, but other strain detection assemblies 20 of other orientations, sizes, shapes, and dispositions would be equally possible and within the scope of the invention.

Returning to FIG. 1, the pressure-detection assembly 22 will now be discussed. In embodiments of the invention, the pressure-detection assembly 22 is configured to detect pressure within a hydraulic cylinder 150 that is associated with the insulated boom section 30. The pressure-detection assembly 22 detects (or provides an indication of) a difference in pressure between a distal end 152 of the hydraulic cylinder 150 and a proximal end 154 of the hydraulic cylinder 150.

In embodiments of the invention, the pressure-detection assembly 22 comprises a first pressure gauge 156, a second pressure gauge 158, and the alarm 24 that may be associated with the central computing unit. The first pressure gauge 156 is disposed at the distal end 152 of the hydraulic cylinder 150, and the second pressure gauge 158 is disposed at the proximal end 154 of the hydraulic cylinder 150. In some embodiments of the invention, the first pressure gauge 156 is dispose beyond the piston and the second pressure gauge 158 is disposed before the piston (as viewed from the proximal end 154 of the hydraulic cylinder 150). In other embodiments, the first pressure gauge 156 and the second pressure gauge 158 may each be disposed beyond the piston.

In embodiments of the invention, the hydraulic cylinder 150 is configured to lift and lower the insulated boom section 30. The weight of the insulated boom section 30 (as well as any loads and implements 52 thereon) is therefore placed at least in part on the hydraulic cylinder 150. The pressure in the hydraulic cylinder 150 is sufficient to overcome the weight of the insulated upper boom, the load, and the implement 52. Typically, the pressure throughout the hydraulic cylinder 150 should be substantially uniform. However, when the insulated boom section 30 is under strain, the pressure is distributed across the interior of the hydraulic cylinder 150. Therefore, a ratio of a reading of the first pressure gauge 156 to a reading of the second pressure gauge 158 is utilized to estimate a load emplaced on the insulated boom section 30. In embodiments of the invention, historical testing may identify a certain ratio, a certain range of ratios, or a certain threshold ratio which is indicative of the strain that may potentially cause structural damage to the insulated boom section 30.

In embodiments of the invention, a central computing unit may be utilized for estimating a total load emplaced on the insulated boom section 30 and comparing the total load to a maximum allowable load. For example, the insulated boom section 30 may have a maximum allowable safe load of four hundred pounds. The central computer therefore utilizes the static strain-detection assembly 20 and/or the pressure-detection assembly 22 to determine or estimate the load on the insulated boom section 30. In order to accomplish this, the static strain-detection assembly 20 and/or the pressure-detection assembly 22 are communicatively coupled with a central computing unit for calculating a total load on the insulated boom section 30.

In embodiments of the invention, the central computing unit is communicatively coupled with the alarm 24. The alarm 24 is used to alert the utility worker of potential structural damage to the insulated boom section 30. In some embodiments of the invention, the alarm 24 is a component of or associated with the static strain-detection assembly 20 and/or the pressure-detection assembly 22. In other embodiments, the alarm 24 is a component of the boom protection system 18. In still other embodiments, the alarm 24 is a component of or associated with the central computing unit.

In some embodiments, the alarm 24 presents the utility worker with a visual indication, an audible indication, or other type of indication to let the utility worker know that a potentially unsafe condition exists within the insulated upper boom section. In some embodiments, the alarm 24 is configured to communicate with a remote, external computer system. The external computer system may be associated with a headquarters location, a maintenance location, supervisor location, or other location. This allows corrective action to be taken and monitored.

In some embodiments of the invention, the components discussed herein are utilized with other pressure- and strain-detecting devices of the prior art. In one embodiment, a four-bar linkage is utilized to connect the distal end 36 of the insulated boom section to the utility platform. A substantially vertically-oriented hydraulic cylinder 150 may be disposed within the four-bar linkage. The pressure as measured within the hydraulic cylinder 150 may then be associated with the platform load. The lengths of the linkages, the length and diameter of the hydraulic cylinder 150, and other considerations are chosen for high accuracy in the expected range of loads. In other embodiments, this hydraulic cylinder 150 may additionally or alternatively be an electronic load cell or a strain gauge 58.

Various methods of the invention will now be discussed. A method of protecting a boom section so as to prevent failure of the boom section, the method comprising the following steps: measuring load from a first strain-detection assembly 20 disposed at the distal end 36 of the insulated boom section 30, wherein the first strain-detection assembly 20 is associated with a first implement 52; measuring load from a pressure-detection assembly 22 associated with an actuator configured to move the boom section; calculating a total strain on the boom section; determining whether the total strain is above a certain threshold; and alerting a user that the total strain is above the certain threshold.

In embodiments of the invention, the step of calculating the total strain and the step of determining whether the total strain is above the certain threshold are performed by a central computing unit. The total strain is calculated based upon the measured strain from the static strain-detection assembly 20 and the measured strain from the pressure-detection assembly 22. The step of measuring load from the first strain-detection assembly 20 is performed by receiving an indication from a first strain gauge 58 disposed on a traversing member 56 within the void 60 of a subject plate 54.

In embodiments of the invention, the step of measuring load from the pressure-detection assembly 22 is performed by the following steps: determining a first pressure reading from a first pressure gauge 156 disposed at a distal end 152 of a hydraulic cylinder 150; determining a second pressure reading from a second pressure gauge 158 disposed at a proximal end 154 of the hydraulic cylinder 150, wherein the hydraulic cylinder 150 is associated with moving the insulated boom section 30 relative to the base 12 or another boom section; and determining a ratio of the first pressure reading of the first pressure gauge 156 to a second pressure reading of the second pressure gauge 158. In some embodiments of the invention, the method may also comprise measuring load from a second strain-detection assembly 20 disposed at the distal end 36 of the boom section, wherein the second strain-detection assembly 20 is associated with a second implement 52.

In some embodiments, the method may also include sending, to an external computing system, an indication that the total strain is above the certain threshold. This step of sending the indication may be performed remotely and substantially in real time, so as to allow an administrator to ensure that corrective actions are taken.

Other embodiments of the invention are directed to a method of protecting a boom section so as to prevent failure of the boom section, the method comprising the following steps: measuring load from a first strain-detection assembly 20 disposed at a distal end 36 of the boom section, wherein the first strain-detection assembly 20 is associated with a first implement 52; determining a strain on the boom section based upon at least one criteria selected from the group consisting of a position of the boom section, an elongation of the boom section, and an orientation of the boom section; calculating a total strain on the boom section based upon the measured strain from the first strain-detection assembly 20 and the determined strain from the at least one criteria, determining whether the total strain is above a certain threshold; and alerting a user that the total strain is above the certain threshold.

It should be appreciated that, while the above disclosure has been generally directed to the field of aerial work platforms, embodiments of the invention may be directed to other fields and uses. For example, embodiments of the invention may be utilized in conjunction with metal boom sections, cranes, and other platforms. Still other embodiments of the invention may be used in virtually any field or application in which four-bar linkages are common. For example, various embodiments of the invention can be utilized to determine strain on virtually any physical structure.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A static strain-detection assembly configured to be secured at a distal end of an insulated boom section so as to measure a load upon the insulated boom section, the static strain-detection assembly comprising:
   a first subject plate presenting a first void,
   wherein the first subject plate is configured to be installed between the distal end of the insulated boom section and an implement; and
   a first traversing member spanning the first void;
   wherein the first traversing member presents a gauge receptor,
   wherein the gauge receptor is configured to receive a first strain gauge disposed adjacent to the gauge receptor,
   wherein the first strain gauge is configured to measure a load upon the traversing member.

2. The static strain-detection assembly of claim 1,
   wherein the first subject plate is disposed between a platform bracket of the insulated boom section and the implement,
   wherein the first subject plate supports at least a portion of a weight of the implement,
   wherein the implement is a utility platform.

3. The static strain-detection assembly of claim 1,
   wherein the first subject plate is disposed on a housing of a pin interface assembly,
   wherein the pin interface assembly includes a boom-interface pin configured to be secured to the distal end of the insulated boom section.

4. The static strain-detection assembly of claim 1, further comprising
   wherein the first subject plate is oriented vertically,
   wherein the first traversing member is oriented diagonally,
   wherein the first subject plate is monolithic with the first traversing member.

5. The static strain-detection assembly of claim 1,
   wherein the first subject plate is associated with a pin interface assembly,
   wherein the pin interface assembly presents a boom-interface pin configured to be installed into the distal end of the insulated boom section,
   wherein the pin interface assembly presents an upper implement-pin receptor and a lower implement-pin receptor configured to interface with the implement.

6. The static strain-detection assembly of claim 5,
   wherein the pin interface assembly further comprises a housing,
   wherein the housing comprises the first subject plate, a top plate, a bottom plate, and a second subject plate.

7. The static strain-detection assembly of claim 1, further comprising:
   a second subject plate presenting a second void therein,
   wherein the subject plate is configured to be installed between the distal end of the insulated boom section and the utility platform;
   a second traversing member spanning the second void; and
   a second strain gauge disposed adjacent to the second traversing member.

8. The static strain-detection assembly of claim 7,
   wherein the second subject plate is disposed parallel to the first subject plate,
   wherein a first reading is associated with the first strain gauge of the first subject plate,
   wherein a second reading is associated with the second strain gauge of the second subject plate,
   wherein the first strain gauge and the second strain gauge are configured to communicatively coupled with a central computing unit for calculating a total load on the insulated boom section.

9. A method of protecting a boom section so as to prevent failure of the boom section, the method comprising the following steps:
   measuring a load from a first strain-detection assembly disposed at a distal end of the boom section,
   wherein the first strain-detection assembly is associated with a first implement;
   measuring a load from a pressure-detection assembly associated with an actuator configured to move the boom section;
   calculating a total strain on the boom section;
   determining whether the total strain is above a certain threshold; and
   alerting a user that the total strain is above said certain threshold.

10. The method of claim 9, wherein said step of calculating the total strain and said step of determining whether the total strain is above said certain threshold are performed by a central computing unit.

11. The method of claim 9, wherein the total strain is calculated based upon said measured strain from the static strain-detection assembly and said measured strain from the pressure-detection assembly.

12. The method of claim 9, wherein the step of measuring load from the first strain-detection assembly is performed by receiving an indication from a first strain gauge disposed on a traversing member within a void of a subject plate.

13. The method of claim 9, wherein the step of measuring load from the pressure-detection assembly is performed by
   determining a first pressure reading from a first pressure gauge disposed at a distal end of a hydraulic cylinder;
   determining a second pressure reading from a second pressure gauge disposed at a proximal end of said hydraulic cylinder,
   wherein said hydraulic cylinder is associated with moving the boom section relative to a base; and
   determining a ratio of the first pressure reading of the first pressure gauge to a second pressure reading of the second pressure gauge.

14. The method of claim 9, further comprising the following steps:
   measuring load from a second strain-detection assembly disposed at the distal end of the boom section,
   wherein the second strain-detection assembly is associated with a second implement.

15. The method of claim 9, further comprising the following step:
   sending, to an external computing system, an indication that the total strain is above said certain threshold.

16. The method of claim 15,
   wherein the step of sending the indication is performed remotely and substantially in real time,
   wherein the step of sending the indication is performed so as to allow an administrator to ensure that corrective actions are taken.

17. A method of protecting a boom section so as to prevent failure of the boom section, the method comprising the following steps:

measuring a load from a first strain-detection assembly disposed at a distal end of the boom section, wherein the first strain-detection assembly is associated with a first implement;

determining a strain on the boom section based upon at least one criteria selected from the group consisting of a position of the boom section, an elongation of the boom section, and an orientation of the boom section;

calculating a total strain on the boom section based upon said measured strain from the first strain-detection assembly and said determined strain from the at least one criteria;

determining whether the total strain is above a certain threshold; and alerting a user that the total strain is above said certain threshold.

18. The method of claim 17, wherein said step of calculating the total strain and said step of determining whether the total strain is above said certain threshold are performed by a central computing unit.

19. The method of claim 17, further comprising the following step:

sending, to an external computing system, an indication that the total strain is above said certain threshold, wherein the step of sending the indication is performed remotely and substantially in real time, wherein the step of sending the indication is performed so as to allow an administrator to ensure that corrective actions are taken.

20. The method of claim 17, further comprising the following step:

measuring a load from a pressure-detection assembly associated with an actuator configured to move the boom section.

21. The method of claim 17, wherein there is a load associated with the implement.

* * * * *